W. W. WALKER.
Bee Hive.
No. 37,414.                                   Patented Jan. 13, 1863.
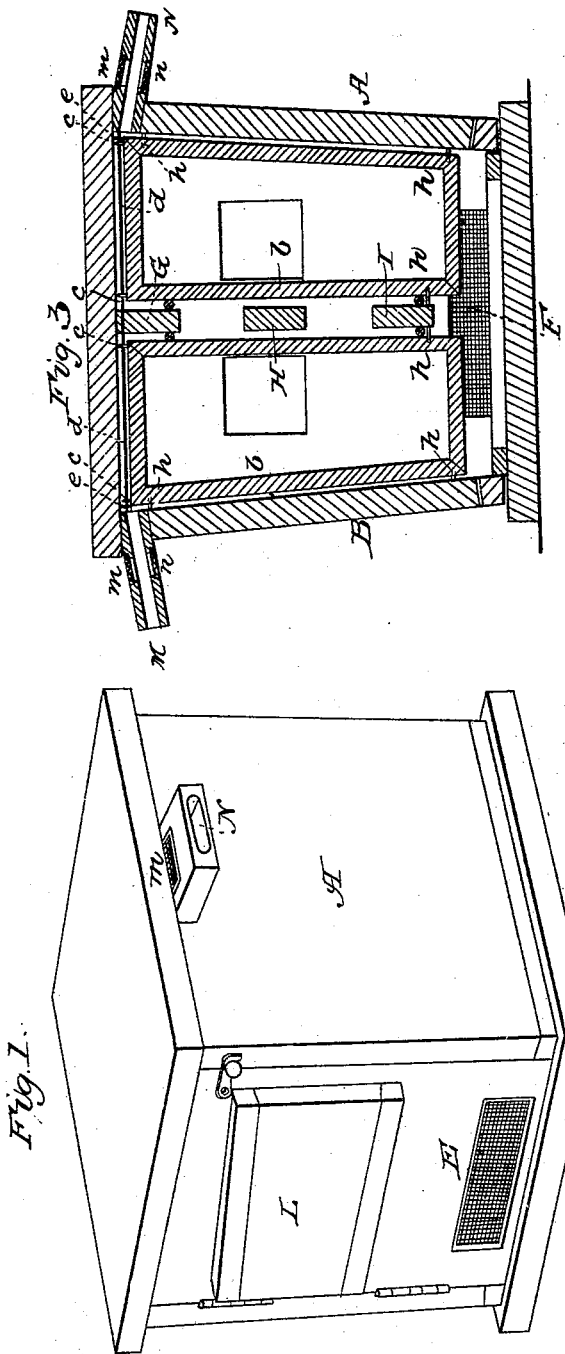
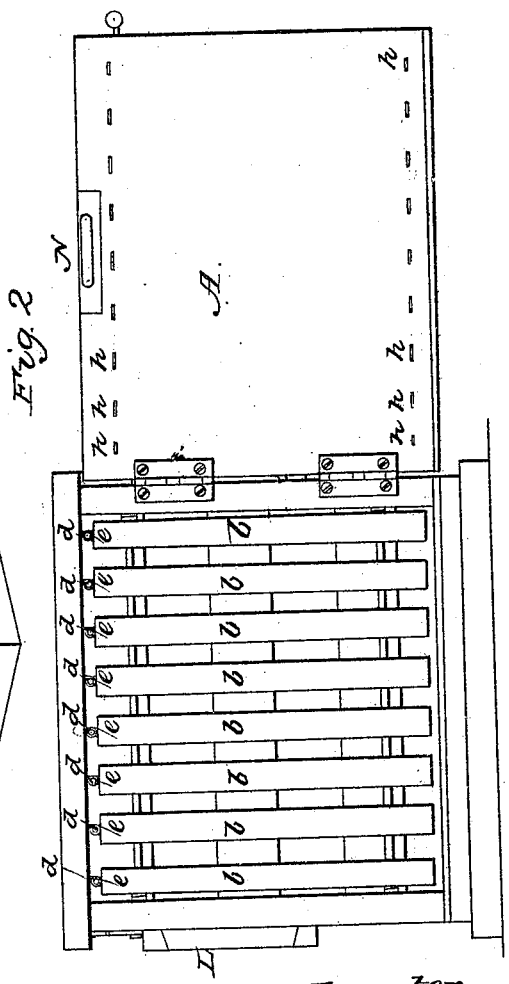

UNITED STATES PATENT OFFICE.

WILLIAM W. WALKER, OF NETTLE LAKE, OHIO.

IMPROVEMENT IN BEE-HIVES.

Specification forming part of Letters Patent No. 37,414, dated January 13, 1863.

*To all whom it may concern:*

Be it known that I, W. W. WALKER, of Nettle Lake, in the county of Williams and State of Ohio, have invented certain new and useful Improvements in Bee-Hives; and I do hereby declare that the following is a full and complete description of the construction and operation of the same, reference being had to the accompanying drawings, making a part of this specification, in which—

Figure 1 is a perspective view. Fig. 2 is a side view, with the door open. Fig. 3 is a vertical section.

Like letters of reference denote the same parts in the several views.

My improvement relates to constructing a bee-hive in such a way that moths are excluded and entirely prevented from entering the hive at any part of it.

Fig. 1 represents the hive, which may be of any suitable form and size. The sides A and B are hinged onto the hive, and can be opened, as in Fig. 2, for the purpose of removing and replacing the frames or comb-guides $b$, which are of an oblong, square form, wider at the top than the bottom, conforming to the shape of the hive. These frames are supported by having wire loops $c$ at the top, that pass onto the horizontal wires $d$, the ends of these wires being put into the catches $e$, secured to the top of the hive. There are two rows of frames separated in the middle by cross-pieces G H I, as represented in Fig. 1, accessible from each side by means of the doors A and B, and they can be removed at any time by disengaging the ends of the wires $d$ from the catches $e$ and sliding them off. In this way one or more frames can at any time readily be removed and replaced, as may be desired. There are wire loops $h$ on the inside of the doors, forming the sides, and in the cross-bar I, that pass in between the frames, keeping them the desired distance apart. The bees enter and leave the hive through the passage-ways M N on each side at the top of the hive, and above and below these passage-ways are open spaces covered with wire-gauze, as seen at $m$ $n$ in Figs. 1 and 2. There are also openings in the lower part of both ends of the hive that are covered with wire-gauze, as represented at E and F. These openings, as described, accomplish two objects—of excluding the moths and ventilating the hive. The pieces of wire-gauze E and F at the lower part of the hive emit the scent of the bees, and the miller or moth is attracted toward it, but is deceived, as it can find no place to enter. Moths do not usually enter a hive at the place where the bees go in and out at, but should they go up to the top and attempt an entrance through the passage-ways M N, the pieces of wire-gauze $m$ $n$ which they will not pass would prevent them. If thought necessary, the wire-gauze can extend all round the passage-ways.

This hive has been practically tested, and found to exclude moths effectually in the way hereinbefore described.

The arrangement of openings covered with gauze for the exclusion of moths is applicable to hives of different construction, and may be applied without changing the nature of the invention.

L is a slide in each end of the hive, covering windows that admit light, and are for the purpose of looking into the hive.

What I claim as my improvement, and desire to secure by Letters Patent, is—

The arrangement of the gauze openings E F and the passage-ways M N with the gauze openings $m$ $n$, in combination with the hive, substantially as set forth.

WM. W. WALKER.

Witnesses:
 JARED TINGLEY,
 GEORGE LEE, Jr.